US007313681B2

(12) United States Patent
Chen et al.

(10) Patent No.: US 7,313,681 B2
(45) Date of Patent: Dec. 25, 2007

(54) APPARATUS, SYSTEM, AND METHOD FOR ADAPTER FASTLOAD

(75) Inventors: James Chien-Chiung Chen, Tucson, AZ (US); Brian Jeffrey Corcoran, Oro Valley, AZ (US); Matthew Joseph Kalos, Tucson, AZ (US); Ricardo Sedillos Padilla, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/717,822

(22) Filed: Nov. 20, 2003

(65) Prior Publication Data

US 2005/0125650 A1    Jun. 9, 2005

(51) Int. Cl.
*G06F 9/00* (2006.01)
*G06F 9/24* (2006.01)
*G06F 15/177* (2006.01)

(52) U.S. Cl. .............................. 713/2; 713/1; 713/100
(58) Field of Classification Search ................ 713/1, 713/2, 100
See application file for complete search history.

(56) References Cited

U.S. PATENT DOCUMENTS

| 5,727,177 | A  | * | 3/1998  | McMinn et al. ............ 712/218 |
| 5,960,445 | A  | * | 9/1999  | Tamori et al. ............. 707/203 |
| 6,175,919 | B1 | * | 1/2001  | Ha ........................... 713/100 |
| 6,658,659 | B2 | * | 12/2003 | Hiller et al. .............. 717/170 |
| 6,684,393 | B1 | * | 1/2004  | Loen et al. ................ 717/151 |
| 6,732,267 | B1 | * | 5/2004  | Wu et al. ................... 713/100 |
| 6,990,577 | B2 | * | 1/2006  | Autry ......................... 713/100 |
| 2003/0033515 | A1 | * | 2/2003 | Autry ......................... 713/100 |
| 2004/0003377 | A1 | * | 1/2004 | Di Loreto .................. 717/136 |
| 2004/0044997 | A1 | * | 3/2004 | Talati et al. ............... 717/170 |

FOREIGN PATENT DOCUMENTS

| JP | 06-095944 | 4/1994 |
| JP | 07-099674 | 4/1995 |
| JP | 08-095772 | 4/1996 |
| JP | 09-054690 | 2/1997 |

* cited by examiner

*Primary Examiner*—Rehana Perveen
*Assistant Examiner*—Michael J. Brown
(74) *Attorney, Agent, or Firm*—Kunzler & McKenzie (57) ABSTRACT

An apparatus, system, and method are disclosed for fastload code update on a communications adapter. The apparatus includes an image load module, a memory initialization module, and an image overlay module. The image load module is configured to load a copy of a new code image in a memory on the communications adapter. The memory also concurrently stores a copy of an old code image used by the communications adapter. The memory initialization module is configured to invoke the new code image to perform a memory initialization operation. The memory initialization module may perform the memory initialization operation concurrently with ongoing I/O requests possibly accepted, but not necessarily processed, by the old code image. The image overlay module is configured to overlay the old code image with the new code image. The fastload code update minimizes the time that the communications adapter is off-line to overlay the old code image with the new code image and reinitialize the communications adapter.

27 Claims, 8 Drawing Sheets

FIG. 1

Prior Art

APPARATUS, SYSTEM, AND METHOD FOR ADAPTER FASTLOAD

BACKGROUND OF THE INVENTION

1. Field of the Invention

This invention relates to embedded code, such as microcode, and more particularly relates to an apparatus, system, and method for a code image update on a communications adapter.

2. Description of the Related Art

Users continue to require high availability from computer systems and computer subsystems. Web servers, database servers, application servers, and the like are expected to be available around the clock. Maintenance and upgrades to these systems should minimize time the system is off-line.

The computer system or subsystem includes a basic set of instructions for performing operations. This basic set of instructions comprises a fundamental set of computer instructions, similar to an operating system, which define how the computer system or subsystem will function. Generally, this basic set of instructions is referred to as the code image, microcode, embedded code, or the like. The code image typically includes assembly code instructions or raw machine language binary code instructions that are optimized for a particular microprocessor and/or set of hardware.

Typically, a Basic Input Output System (BIOS) program loads the code image into volatile RAM when a computer system is powered on. Alternatively, the code image is stored in non-volatile RAM or other forms of memory. Execution of the instructions in the code image begins once the computer system properly initializes.

Periodically, the code image must be updated to provide improved functionality, resolve programming bugs, and/or support new hardware. It is desirable that an old code image be updated with a new code image with minimal interruption of the computer system concurrently executing the old code image. In addition, it is desirable that the new code image be stored in approximately the same location in memory as the old code image. Specifically, the new code image may be larger or smaller than the old code image, but is generally stored at least in part over the old code image. The code image update should require minimal time, comprise operations of minimal complexity and provide minimal delay in resuming regular operations once the update completes.

Conventionally, code image updates are performed by a section of the old code image known as the bootstrap code. The bootstrap code is executed in response to an interrupt signaling a code image update operation. Generally, the bootstrap code copies a new code image directly from a source, such as a disk drive, into the same space occupied by the old code image. The copy operation partially or wholly overwrites the old code image with the new code image. This process is known as a code overlay.

A typical code overlay process requires that the affected hardware device be off-line for a relatively substantial amount of time. In the case of an I/O adapter, such as a host bus adapter, the process may take several minutes to complete, during which time the host may determine that the adapter has failed and switch over to an alternate path. In the case where no alternate path exists, the entire system may be halted during this lengthy process. Whether the system is halted during the timeout and failover period, or whether the system is entirely off-line during the code overlay process, disruption to I/O paths and system availability to the user can have costly affects.

Accordingly, what is needed are an apparatus, system, and method that minimize the amount of I/O disruption that may occur during a code overlay process. Beneficially, such an apparatus, system, and method would overcome the need for multiple paths, as well as reduce the disruption time to within a tolerable threshold, avoiding timeouts, failures, and the necessary recovery time.

BRIEF SUMMARY OF THE INVENTION

The present invention has been developed in response to the present state of the art, and in particular, in response to the problems and needs in the art that have not yet been fully solved by currently available communications adapters and systems. Accordingly, the present invention has been developed to provide an apparatus, system, and method for fastload code image update on a communications adapter that overcome many or all of the above-discussed shortcomings in the art.

The apparatus for fastload code image update on a communications adapter is provided with a logic unit containing a plurality of modules configured to functionally execute the necessary steps of fastload code image update on a communications adapter. These modules in the described embodiments include a query module, an image load module, an image bridge module, a memory initialization module, an image overlay module, a fastload key module, a standard adapter initialization module, and a fastload adapter initialization module.

In one embodiment, the query module is configured to identify a characteristic of the old code image and to determine a difference or incompatibility between the old code image and the new code image. The image load module is configured to load a copy of a new code image into a memory on a communications adapter, such as a host bus adapter on a host. The image bridge module is configured to reconcile an incompatibility between the old code image and the new code image.

In a further embodiment, the memory initialization module is configured to invoke the new code image to perform a memory initialization operation. The image overlay module is configured to overlay the old code image with the new code image. The fastload key module is configured to create and store a fastload key to indicate a fastload code image update on the communications adapter. The standard adapter initialization module is configured to initialize the communications adapter using a standard initialization sequence in response to a failure to access a fastload key. Alternately, the fastload adapter initialization module is configured to initialize the communications adapter using a fastload initialization sequence in response to a fastload code image update and successfully accessing a fastload key prior to invoking the fastload initialization sequence. In a further embodiment, one or more portions of the fastload initialization sequence may be interleaved with or replace the steps of the standard initialization method, thereby requiring only a single initialization path that dynamically reacts to the presence of a fastload key.

A storage system is also presented for facilitating fastload code image update on a communications adapter. In one embodiment, the described system is a storage server and includes a source input device, a storage system processor, and a storage system communications adapter. The source input device is configured to receive a source electronic storage media device, which stores a new code image. The storage system processor is configured to initiate the fastload code image update and notify the host communications adapter of the fastload code image update. The storage system communications adapter is configured to send the new code image to the host communications adapter.

A method of the present invention is also presented for fastload code image update on a communications adapter. The method, in the disclosed embodiments, substantially includes the steps necessary to carry out the functions presented above with respect to the operation of the described apparatus and system. Specifically, one embodiment of the described method includes loading a copy of a new code image in a memory on the communications adapter, invoking the new code image to perform a memory initialization operation, and overlaying the old code image with the new code image. The method also may include additional steps as described herein.

One embodiment of the present invention beneficially minimizes the amount of time that a communications adapter, such as a host bus adapter, is off-line during a code image update. Another embodiment advantageously reduces the amount of time that the communications adapter is off-line so that the host may avoid command timeouts, bad port designations, path removal, required recovery sequences, and so forth. Additionally, in one embodiment, the present invention eliminates, or at least substantially reduces, the present need for multi-path connections from a single host to a storage system.

In a further embodiment, the present invention beneficially allows the old code update to continue processing I/O requests while concurrently loading, or staging, new code onto the communications adapter. Still further, one embodiment of the present invention allows the old code image to continue processing I/O requests while the new code image, or at least a bootstrap module thereof, concurrently executes one or more bootstrap operations, including preparatory code image update functions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
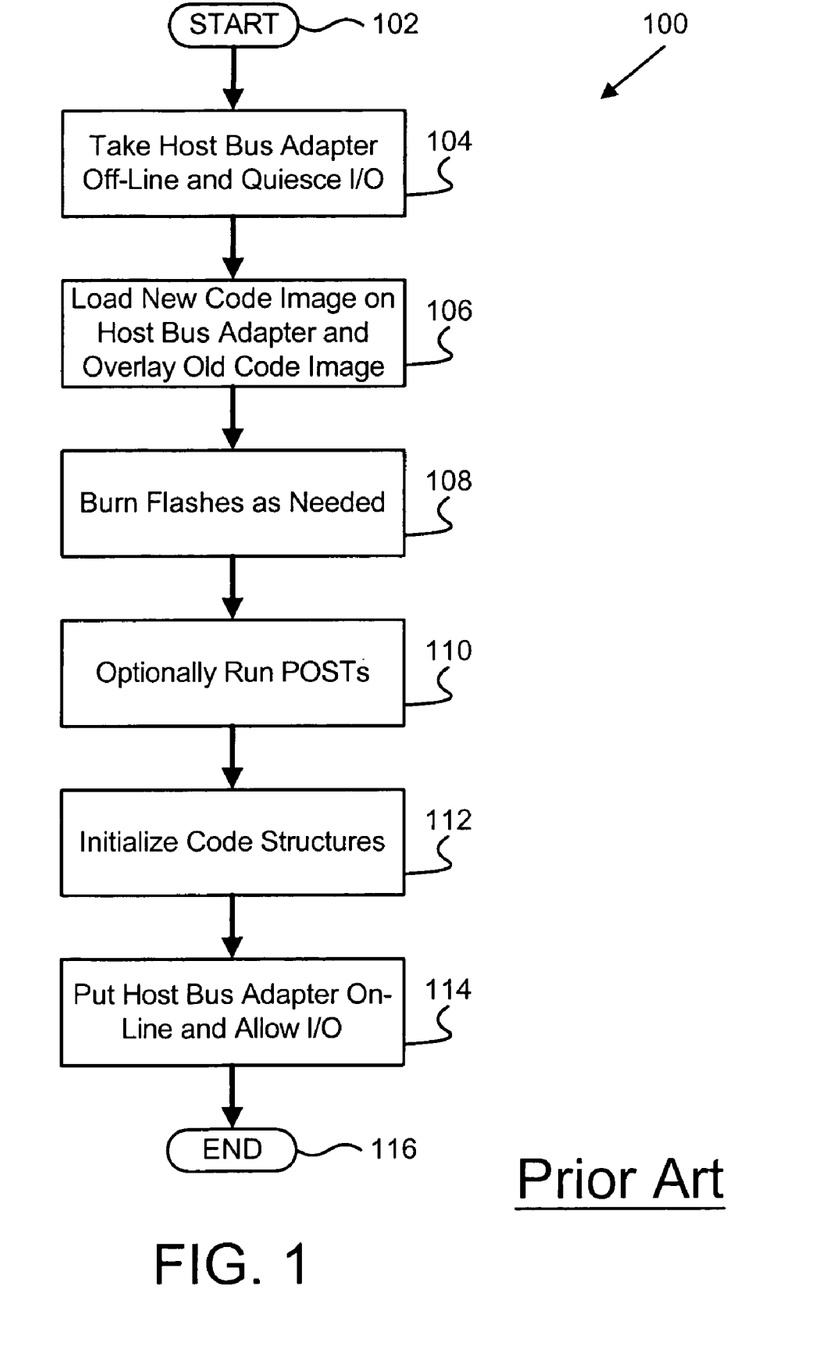
FIG. 1 is a schematic flow chart diagram illustrating a conventional code image update method.

FIG. 1 depicts a conventional code image update method 100. The standard technique for performing a conventional code overlay and reloading an I/O adapter begins 102 by taking 104 the host bus adapter (HBA) off-line and thereby quiescing the I/O. The conventional code image update method 100 then loads 106 the new code image on the host bus adapter and overlays the old code image. The code overlay is conventionally performed by a bootstrap code, for instance, stored in the old code or flash image. Additionally, the new code image burns 108 any flashes, as needed, and runs 110 a power-on self-test (POST).

The new code image then initializes 112 any code structures and puts 114 the host bus adapter back on-line, allowing I/O to resume. The depicted conventional code image update method 100 then ends 116. Although this description is an accurate representation of a conventional code image update method 100, the sequence in which the illustrated steps are executed, as well as additional steps, may vary from one implementation to another.

The host in which the host bus adapter is located may retry to send the I/O during the time that the host bus adapter is off-line, for example, for a time period of approximately two minutes or more. If the host is unable to send the I/O during a retry threshold, the command may timeout for a period, for example, typically between 30 to 60 seconds. The stated off-line and timeout periods are approximate and may vary depending on the specific hardware or application configuration. Upon timing out, the host may assume that the host bus adapter is not functional, label the port "bad," and remove the path from the path group. The host will likely have to perform a recovery sequence in order to reestablish the path. Thus, the conventional code image update method 100 may cause over two minutes or more of outage to the host.

Figure 2:
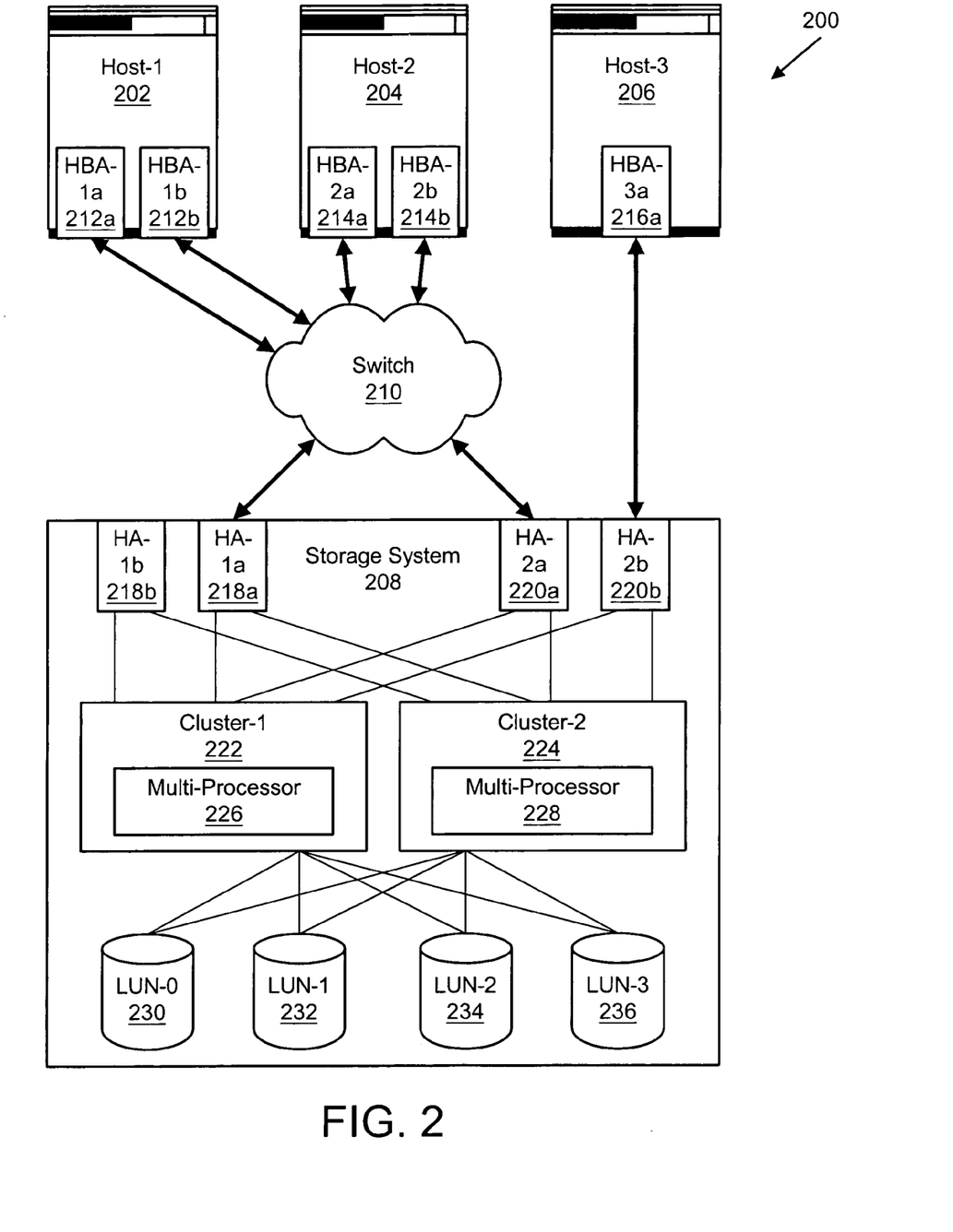
FIG. 2 is a schematic block diagram illustrating one embodiment of a communications system in accordance with the present invention.

FIG. 2 depicts one embodiment of a communication system 200 suitable for implementing the present invention. The illustrated communication system 200 includes three hosts 202, 204, 206 connected to a storage system 208. The storage system 208, in one embodiment, is a storage server configured to store data. The first and second hosts 202, 204 are redundantly connected to the storage system 208 via a switch 210. Alternately, the third host 206 is directly connected to the storage system 208. Other connectivity equipment is omitted for clarity.

Although three hosts 202, 204, 206 are shown in the depicted embodiment, the communication system 200 may operate with fewer or more hosts 202, 204, 206 and storage systems 208. Additionally, the hosts 202, 204, 206 may be connected to the storage system 208 in alternate configurations of varying redundancy and directness. Furthermore, the illustrated cabling connections may comprise Fibre Channel, Enterprise System Connection® (ESCON), Fiber Connection (FICON) channel, Small Computer System Interface (SCSI), and the like.

Each of the depicted hosts 202, 204, 206 includes one or more host bus adapters (HBAs) 212, 214, 216. Each HBA 212, 214, 216 is configured to manage most of the I/O operations required to transfer data between the corresponding host 202, 204, 206 and the storage system 208. In particular, each host bus adapter 212, 214, 216 is optimized to perform many I/O operations very rapidly with little or no involvement by the host 202, 204, 206, minimizing the workload on the host 202, 204, 206.

The depicted storage system 208 includes multiple, redundant host adapters 218, 220 and clusters 222, 224. The host adapters 218, 220 are substantially similar to the host bus adapters 212, 214, 216 described above. Each cluster 222, 224 may include one or more multi-processors 226, 228 and connections to several logical unit numbers (LUNs) 230, 232, 234, 236. In a particular embodiment, one cluster 222 may primarily access the even LUNs 230, 234, while the other cluster 224 may primarily access the odd LUNs 232, 236. The redundant paths between host adapters 218, 220 and clusters 222, 224 and between multi-processors 226, 228 and LUNs 230, 232, 234, 236 allows for data storage and access in the case of a failure, such as a hardware failure. Additionally, the storage system 208 may employ a redundant array of independent disks (RA/D) array, possibly mirroring and striping the stored data, as well as calculating and storing parity data.

Any reference to one of the illustrated hosts 202, 204, 206 is understood to refer to any or all of the hosts 202, 204, 206 unless explicitly noted otherwise. Likewise, any reference to one of the depicted host bus adapters 212, 214, 216 is understood to refer to any one or all of the host bus adapters 212, 214, 216 or host adapters 218, 220 unless explicitly noted otherwise. Once again, reference to one of the redundantly illustrated clusters 222, 224, multi-processors 226, 228, or LUNs 230, 232, 234, 236 is understood to refer to a single corresponding device, respectively, unless explicitly stated otherwise.

Throughout this specification, various embodiments of the present invention will be described in relation to the processor(s) and memory used specifically in the host bus adapters 212, 214, 216 and host adapters 218, 220 for purposes of brevity and clarity in describing the present invention. The embodiments described herein are representative examples and are not intended to limit the scope of the present invention as defined by the claims. One of skill in the art will appreciate that the present invention may be implemented in any computer or electrical system that includes a processor such as a microprocessor, Application Specific Integrated Circuit (ASIC), or the like, that executes code images and allows the code images to be updated using a code overlay.

Figure 3:
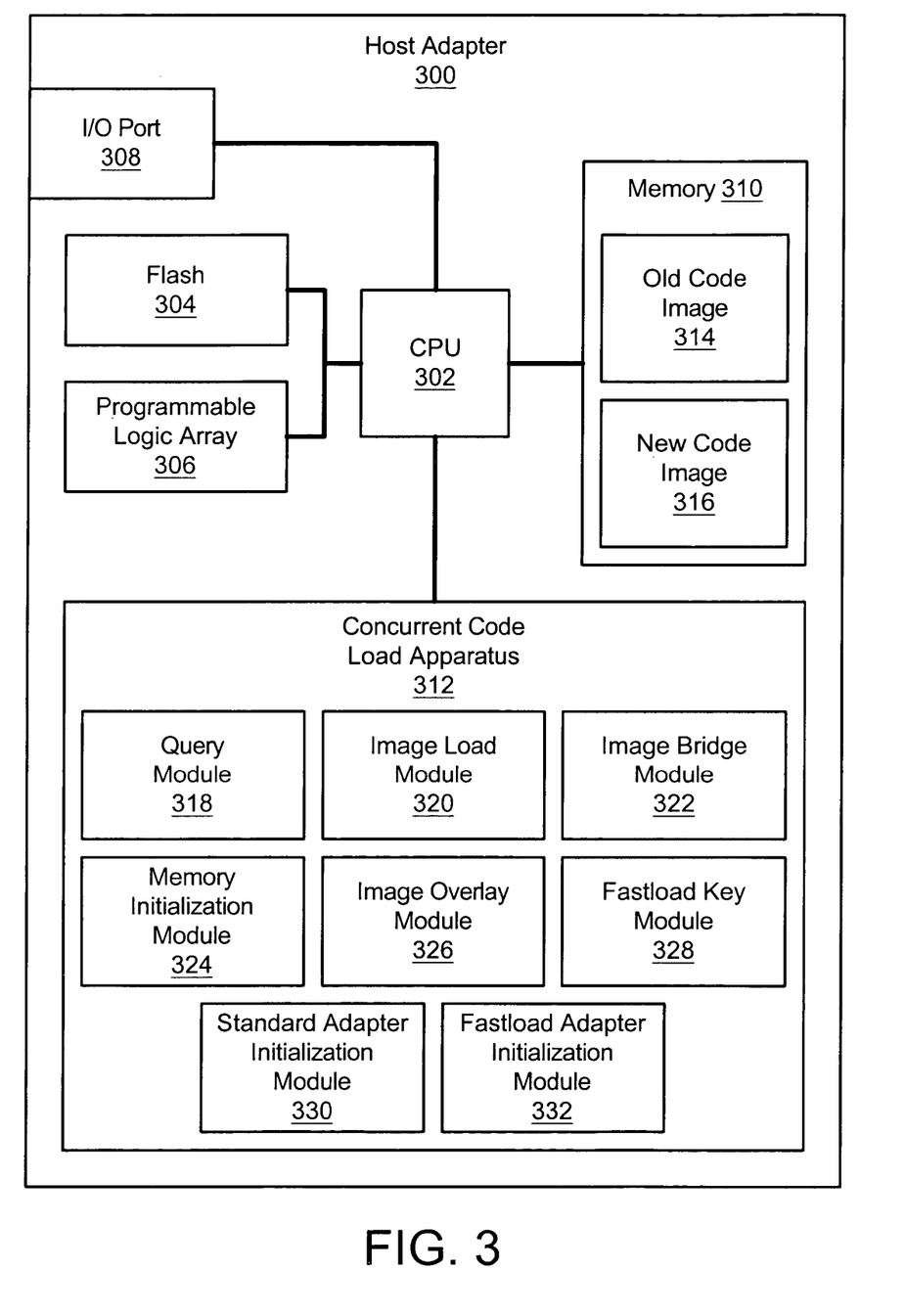
FIG. 3 is a schematic block diagram illustrating one embodiment of a host bus adapter in accordance with the present invention.

FIG. 3 depicts one embodiment of a host bus adapter (HBA) 300 that is substantially similar to the host adapters 218, 220 of FIG. 2. The illustrated host adapter 300 includes a processor (CPU) 302, one or more flash memory devices 304, one or more programmable logic arrays (PLAs) 306, an I/O port 308, a local memory device 310, and a concurrent code load apparatus 312. An existing code image 314 is stored on the local memory device 310. The existing code image 314 is referred to as an old code image 314 because it may be replaced or otherwise discarded by a new code image 316. The new code image 316 may be loaded to and stored on the local memory device 310.

The CPU 202 is configured to execute operational instructions in the old code image 314. In one embodiment, the old code image 314 is configured to allow the host adapter 300 to perform high speed I/O operations, such as between a host 202 and a storage system 208. The flash memory devices 304 and PLAs 306 interact with the CPU 302 to properly perform I/O operations. Additionally, the I/O port 308 allows the host adapter 300 to communicate data and control information with other devices, such as a host 202.

In one embodiment, the new code image 316 is stored in a temporary location on the local memory device 310. Preferably, the temporary memory location is configured such that the CPU 302 may execute instructions stored in the temporary memory location. In one embodiment, the temporary memory location is a buffer within the memory 310. Preferably, the local memory device 310, including the temporary memory location, is high speed main memory such as Random Access Memory (RAM), Non-Volatile Random Access Memory (NVRAM), or the like.

In one embodiment, the old code image 314 and new code image 316 are stored in contiguous blocks within the local memory device 310. Alternatively, the old code image 314 and new code image 316 may be stored in separate blocks within the local memory device 310 or in disparate memory devices. In addition, the local memory device 310 may be configured to store one or more data structures that are separate from the old code image 314 and new code image 316.

The illustrated concurrent code load apparatus 312 includes a query module 318, an image load module 320, an image bridge module 322, a memory initialization module 324, an image overlay module 326, a fastload key module 328, a standard adapter initialization module 330, and a fastload adapter initialization module 332. Although the concurrent code load apparatus 312 is depicted within the host adapter 300, the concurrent code load apparatus 312 or one or more modules may be stored on a processor 226 or another device within the storage system 208.

The query module 318, in one embodiment, is configured to identify a characteristic of the old code image 314 and to determine if there is a difference or incompatibility between the old code image 314 and the new code image 316. In order to determine if an incompatibility exists between the old code image 314 and the new code image 316, the query module 318 may determine if the version of the old code image 314 is different from the version of the new code image 316. Alternately, the query module 318 may determine if the size, location, or other characteristic of the old code image 314 is different from that of the new code image 316.

The image load module 320 is configured, in one embodiment, to load a copy of the new code image 316 in the local memory device 310 or another similar memory device. In a further embodiment, the image load module 320 may load the new code image 316 into a location in the local memory device 310 that is not occupied by a portion of the old code image 314. The new code image 316 may be loaded from a source medium, such as a magnetic disk or optical disk, and, in one embodiment, is loaded at the storage system 208 and transmitted to the host adapter 218. Alternately, the new code image 316 may be loaded at the host 202 in order to update an old code image 314 on the host bus adapter 212.

The image bridge module 322 is configured, in one embodiment, to reconcile an incompatibility between the old code image 314 and the new code image 316. The exact instructions that may be executed to reconcile the incompatibility may depend on the type of incompatibility that is reconciled. In one instance, reconciling the incompatibility may comprise changing the order of initialization for storage registers, memory, or hardware devices. In another instance, reconciling the incompatibility may comprise converting the format of a data structure in order for the new code image 316 to use the data structure. Still other types of operations may be executed to reconcile further types of incompatibilities.

The memory initialization module 324, in one embodiment, is configured to initialize the local memory device 310, or a portion thereof, in preparation for overlaying the old code image 314 with the new code image 316. The memory initialization module 324 may be further configured to initialize the local memory device 310, or a portion thereof, so that an executable within the new code image 316 may be executed from a temporary memory location. In a further embodiment, the memory initialization module 324 may be configured to initialize the flash memory device 304 and the PLA 306.

The image overlay module 326 is configured, in one embodiment, to overlay the old code image 314 with the new code image 316. Such overlay may copy the new code image 316 over all or part of the old code image 314. Additionally, such overlay may copy portions of the new code image 316 into locations that are not occupied by the old code image 314. Additionally, the image overlay module 326 may be configured to perform error detection and error correction to verify that the new code image 316 is successfully copied. In alternate embodiments, the image overlay module may or may not remove the copy of the new code image 316 from the temporary memory location.

The fastload key module 328 is configured, in one embodiment, to create and store a fastload key. The fastload key may designate that the old code image 314 in the host adapter 218 was successfully overlaid by the new code image 316 using a fastload code overlay. The fastload key may be stored, in one embodiment, in the metadata segment 502 of the new code image 316. The fastload key module 328 also may determine, upon reestablishment of I/O communications after a fastload code overlay, if the host adapter 218 may be initialized using a fastload initialization sequence instead of a standard initialization sequence. In one embodiment, the fastload initialization sequence may include all or part of a standard adapter initialization sequence.

The standard adapter initialization module 330 is configured, in one embodiment, to initialize the host adapter 218 using a conventional initialization sequence. The host adapter 218 is initialized to begin I/O communications after, for example, the host adapter 218 is taken off-line and put back on-line. The standard adapter initialization module 330 may initialize the host adapter 218 using a conventional initialization sequence, including normal boot handshakes and POSTs, if no fastload key is found within the metadata segment 502 of the new code image 316.

The fastload adapter initialization module 332 is configured, in one embodiment, to initialize the host adapter 218 using a fastload initialization sequence. The fastload initialization sequence minimizes the amount of time necessary to initialize the host adapter 300, for example, by assuming that memory and/or hardware are already in a valid state because these states are verified prior to the code overlay. In one embodiment, the initialization variables in the local memory device 310 are initialized during the code update process. In a further embodiment, the hardware machine state is verified to be valid, i.e. having a good error correction code (ECC), before beginning the code update process. In a certain embodiment, the fastload adapter initialization module 332 only invokes the fastload initialization sequence if the proper fastload key is provided. Furthermore, the fastload adapter initialization module 332 may invoke one or more portions of the fastload initialization sequence to be carried out during a conventional initialization sequence. In this manner, a standard initialization sequence may be modified to include one or more steps from a fastload initialization sequence. For example, the fastload adapter initialization module 332 may invoke one or more fastload initialization operations during implementation of a conventional initialization sequence, thereby effectuating a fastload initialization sequence.

Figure 4:
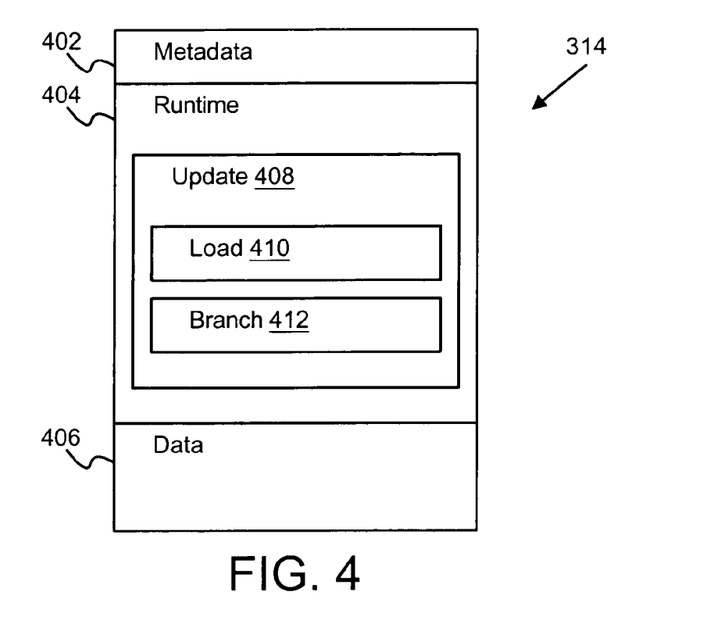
FIG. 4 is a schematic block diagram illustrating one embodiment of an old code image in accordance with the present invention.

FIG. 4 depicts one embodiment of an old code image 314 that maybe stored in the local memory device 310 of the host adapter 300 shown in FIG. 3. The illustrated old code image 314 includes a metadata segment 402, a runtime segment 404, and a data segment 406. The metadata segment 402 may include metadata that is descriptive of the old code image 314 and its contents. The runtime segment 404, in one embodiment, includes one or more instructions that are executable by the CPU 302. Instructions in the runtime segment 404 may be referred to as "text." The data segment 406 includes any data and/or data structures that may be used by the executable code in the runtime segment 404. Although the metadata segment 402, runtime segment 404, and data segment 406 are each depicted as a single block of data, these segments 402, 404, 406 may be divided and the portions thereof interspersed among one another in various configurations within the local memory device 310.

In one embodiment, the runtime segment 404 may include an update module 408. The update module 408 may comprise a load module 410 and a branch module 412. The load module 410 is configured, in one embodiment, to load the new code image 316 into the local memory device 310. The load module 410 may load the new code image 316 in response to a manual or automatic code update command or interrupt.

As mentioned above, the new code image 316 may be stored in a buffer, a temporary storage location, or another similar location. In a further embodiment, the load module 410 may be configured to perform error checking and other validity checks of the new code image 316 subsequent to loading the new code image 316 into the local memory device 310. Additionally, the load module 410 may configure the local memory device 310 to allow for execution of instructions within the new code image 316 from a temporary memory location.

In conventional code image updates, a bootstrap code (not shown) within the old code image 314 may be executed. In the present invention, however, the branch module 412 may cause the CPU 302 to begin executing instructions located within the new code image 316 rather than the old code image 314. Consequently, since the old code image 314 and the new code image 316 are stored in non-overlapping locations within the local memory device 310 or other devices, the runtime segment 404 and data segment 406 of the old code image 206 may be preserved while instructions from the new code image 316 are executed from the temporary location.

Figure 5:
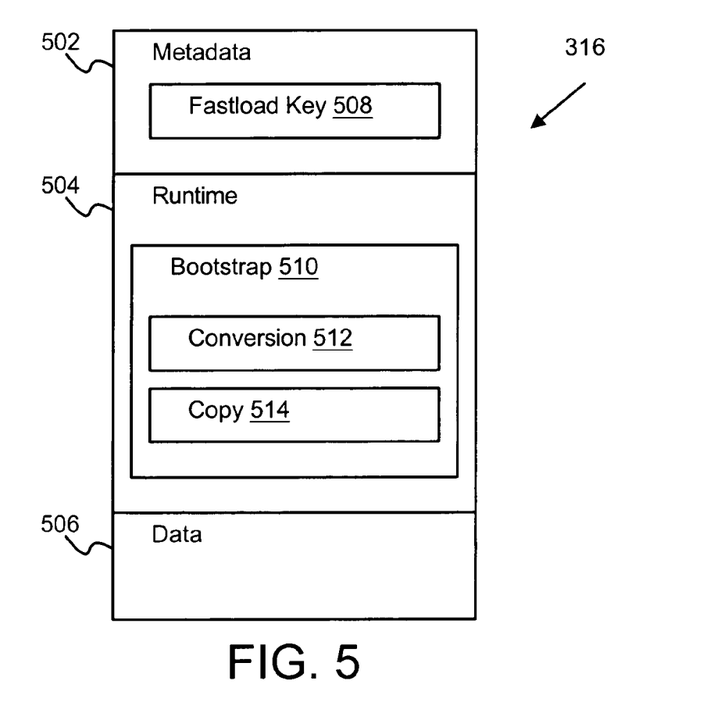
FIG. 5 is a schematic block diagram illustrating one embodiment of a new code image in accordance with the present invention.

FIG. 5 depicts one embodiment of a new code image 316 that may be stored in the local memory device 310 of the host adapter 300 shown in FIG. 3. The illustrated new code image 316 includes a metadata segment 502, a runtime segment 504, and a data segment 506. The metadata segment 502 may include metadata that is descriptive of the new code image 316 and its contents. The runtime segment 504, in one embodiment, includes one or more instructions that are executable by the CPU 302. The data segment 506 includes any data and/or data structures that may be used by the executable code in the runtime segment 404. Although the metadata segment 502, runtime segment 504, and data segment 506 are each depicted as a single block of data, these segments 502, 504, 506 maybe divided and the portions thereof interspersed among one another in various configurations within the local memory device 310.

In one embodiment, the metadata segment 502 may include a fastload key 508, as described with reference to FIG. 3. In one embodiment, the runtime segment 504 may include a bootstrap module 510. The bootstrap module 510 may comprise a conversion module 512 and a copy module 514.

In one embodiment, the conversion module 512 is configured to reconcile potential incompatibilities between the old code image 314 and the new code image 316. Incompatibilities may comprise a difference between the old code image 314 and the new code image 316 which causes the new code image 316 to fail to perform at least one function to the performance level of the old code image 314. Accordingly, incompatibilities may be manifest in various forms. Most notably, an incompatibility may be implicit if the version of the new code image 316 is known to be different from the version of the old code image 314. In one embodiment, the version of the new code image 316 may be stored in the metadata segment 502 of the new code image 316. Similarly, the version of the old code image 314 may be stored in the metadata segment 402 of the old code image 314.

At least one incompatibility may comprise a difference between data structures used by the old code image 314 and data structures used by the new code image 316. The differences between the data structures may be different values, different formats, and the like. The data structures may be data structures stored in the old code image 314 or in the new code image 316.

In a further embodiment, another incompatibility may comprise different initialization requirements for the new code image 316 than for the old code image 314. Initialization requirements may comprise resetting of registers, clearing of buffers and/or caches, and the like. In addition, if the new code image 316 adds data structures, these data structures may also need to be initialized.

The conversion module 512 also may be configured to reconcile any incompatibilities that are identified. For example, the conversion module 512 may be configured to adjust data structures and configuration settings so that the new code image 316 adequately performs at least the same functions as the old code image 314. In addition, the new code image 316 may perform additional functions and provide improvements over the old code image 314.

The copy module 514 of the bootstrap module 510 is configured, in one embodiment, to overlay the new code image 316 over at least a portion of the old code image 314. Preferably, the new code image 316 is overlaid so as to begin in the same address of the local memory device 310 as did the old code image 314. In this manner, adverse impacts are minimized to portions of other microcode and hardware interrupts that may rely on predefined or fixed address locations in the local memory device 310. In a certain embodiment, the copy module 514 also may perform integrity and validity checks on the copy of the new code image 316 to verify that the overlaid copy is error free. Additionally, the copy module 514 may flush the local memory device 310 where the new code image 316 was temporarily stored. In a further embodiment, the copy module 514 or the conversion module 512 also may update the flash memory device 304, the PLA 306, or other modules that may interface with the new code image 316.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect to one or more steps, or portions thereof, of the illustrated process. Additionally, the format and symbology employed are provided to explain the logical steps of the process and are understood not to limit the scope of the process. Although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process. Additionally, the order in which a particular process occurs may or may not strictly adhere to the order of the corresponding steps shown.

Figure 6:
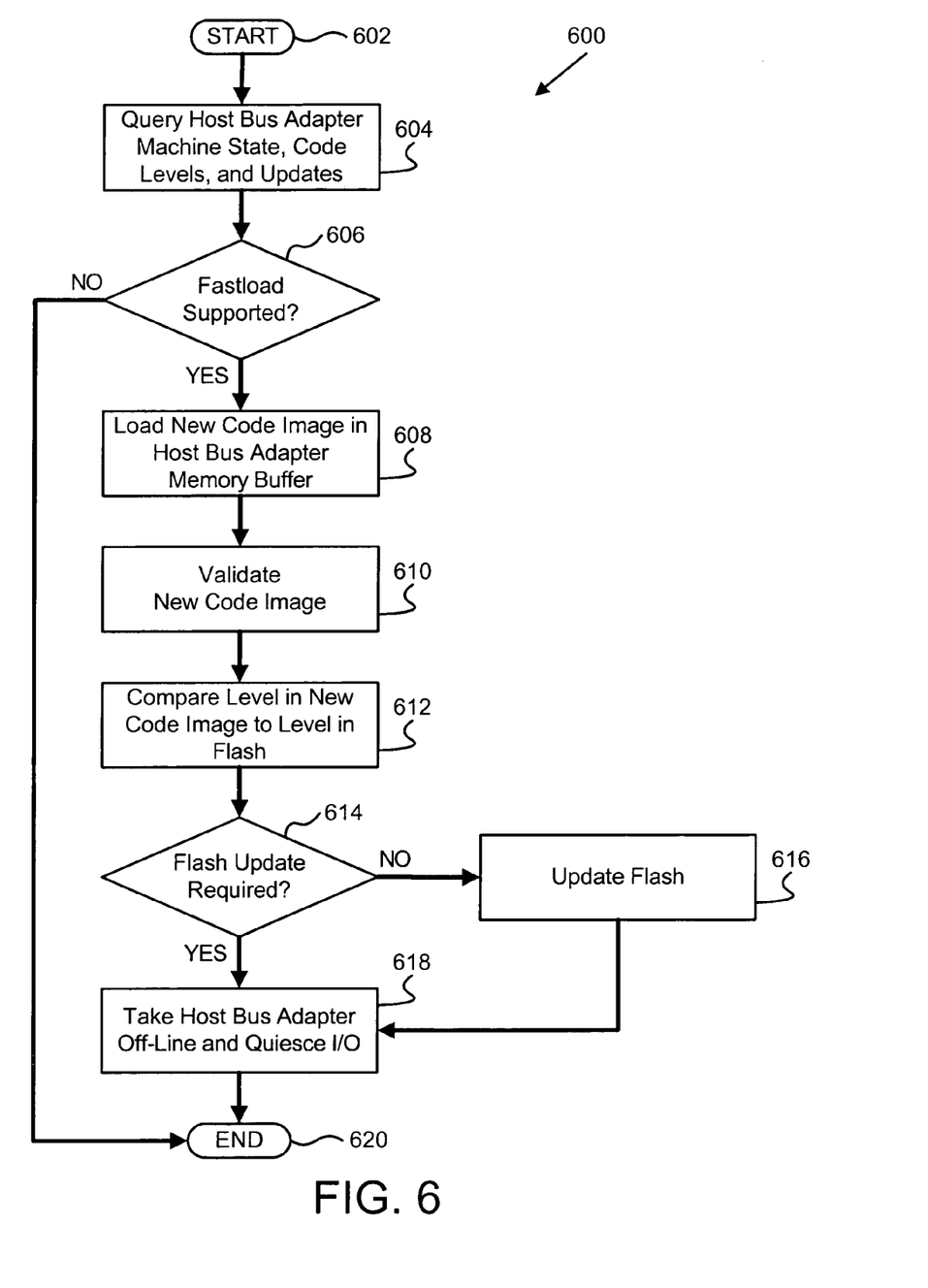
FIG. 6 is a schematic flow chart diagram illustrating one embodiment of a code image preparation method in accordance with the present invention.

FIG. 6 depicts one embodiment of a code image preparation method 600 that may be employed on the host adapter 300 or a host bus adapter 212. The illustrated code image preparation method 600 begins 602 by querying 604 the host adapter 300 for machine states, code levels, and updates. In one embodiment, the query module 318 queries 604 the host adapter 300. The query module 318 also may determine 606 if a fastload code update is supported by the host adapter 300. Such support may depend on the version of the old code image 314, the version of the new code image 316, the hardware components of the host adapter 300, and so forth.

If the fastload code update is supported on the host adapter 300, the image load module 320 proceeds to load 608 the new code image 316 into the local memory device 310, in one embodiment. The image load module 320 also may validate 610 the new code image 316 to verify that the new code image 316 was properly loaded 608. In one embodiment, the image load module 320 may employ error detection and error correction techniques to validate 610 the new code image 316.

The illustrated code image preparation method 600 then continues by comparing 612 the levels in the new code image 316 to levels currently in, for example, the flash memory devices 304. In one embodiment, the image bridge module 322 then determines 614 if the flash memory device 304 needs to be updated and, if so, updates 616 the flash memory device 304. Updating 616 the flash memory device 304 is discussed in more detail with reference to FIG. 7. In a further embodiment, the image bridge module 322 also may determine if any PLAs 306 or other hardware components within the host adapter 300 need to be updated. In a further embodiment, the image bridge module 322 also may reconcile any incompatibilities between the old code image 314 and the new code image 316.

In one embodiment, all of the foregoing steps are performed while the host adapter 300 continues to process I/O communications with the host 202, for example. This is made possible, at least in part, by maintaining the old code image 314 intact while the update module 408 branches to the bootstrap module 510 in the new code image 316, which is stored in a separate memory location from the old code image 314. In other words, the bootstrap module 510 may perform many or all of the foregoing functions while the host adapter 300 continues to accept I/O requests from the host 202.

In one embodiment, the host adapter 300 is taken 618 off-line and the I/O is quiesced (discontinued) only after the foregoing steps have completed. In one embodiment, the host adapter 300 may continue to accept I/O commands from the host without processing such commands. Compared to taking the host adapter 300 off-line prior to performing these functions, the depicted code image preparation method 600 may significantly minimize the amount of time the host adapter 300 is off-line and unable to process I/O requests. The illustrated code image preparation method 600 then ends 620.

Figure 7:
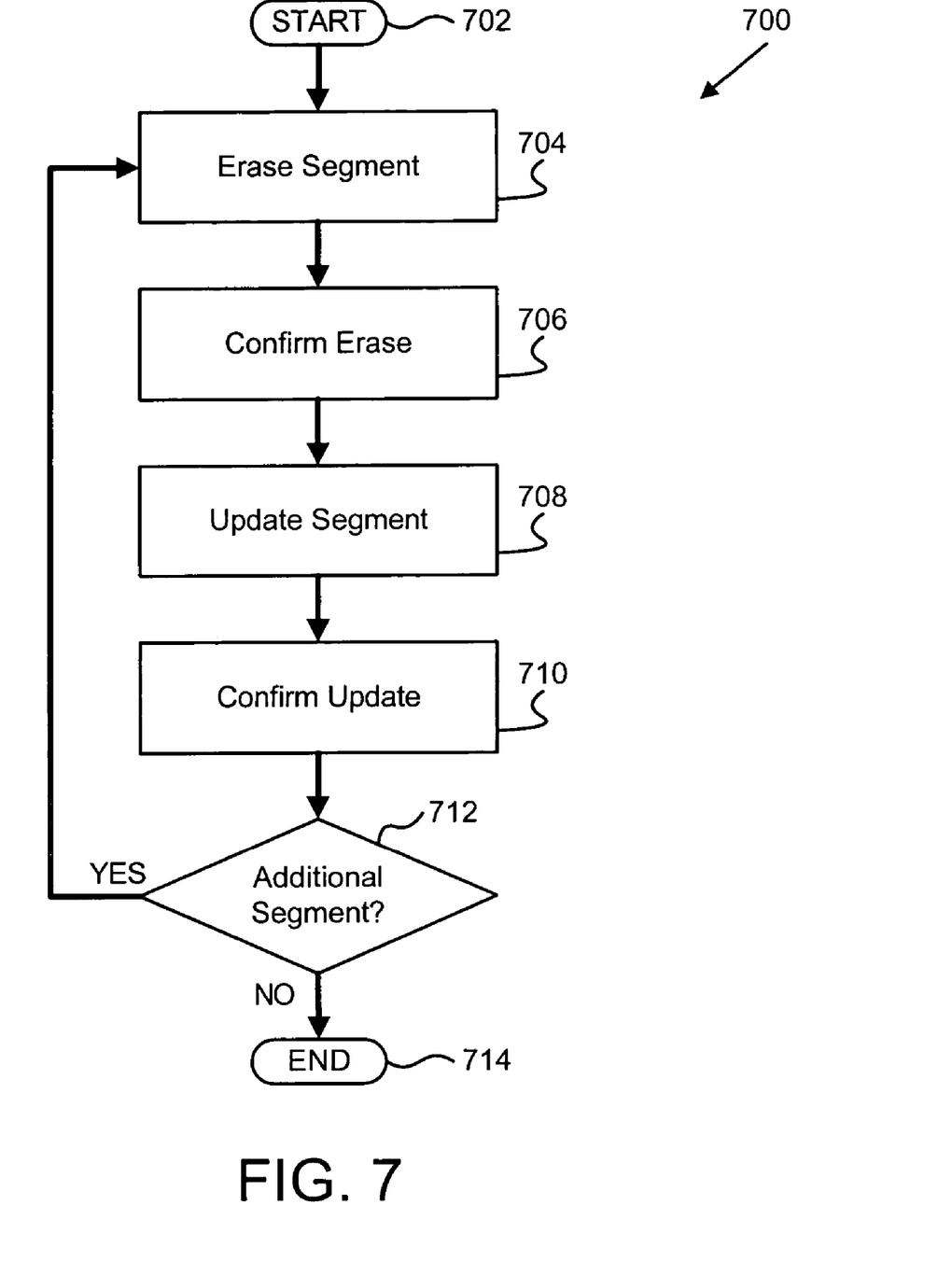
FIG. 7 is a schematic flow chart diagram illustrating one embodiment of a flash update method in accordance with the present invention.

FIG. 7 depicts one embodiment of a flash update method 700 that is given by way of example of updating 616 a flash memory device 304 as presented in the code image preparation method 600 of FIG. 6. In one embodiment, updating a flash memory device 304 is performed in small segments. The illustrated flash update method 700 begins 702 by erasing 704 a segment in the flash memory device 304 and then confirming 706 the completion of the erasure 704. The flash update method 700 continues by updating 708 the erased segment and confirming 710 that the update 710 completed properly. The flash update method 700 then determines 712 if additional segments need to be updated and, if so, returns to erase 704 the subsequent segment.

Once all of the segments have been properly updated 708 and confirmed 710, the depicted flash update method 700 then ends 714. As mentioned above, one or more flash memory devices 304 may be updated while the host adapter 300 concurrently continues to accept I/O requests. In this manner, updating the flash memory devices 304 does not increase the time that the host adapter 300 is off-line, even though erasing 704 and updating 708 each segment may take a relatively long time. In a further embodiment, the PLAs 306 and other hardware also may be updated during concurrent I/O processing.

Figure 8:
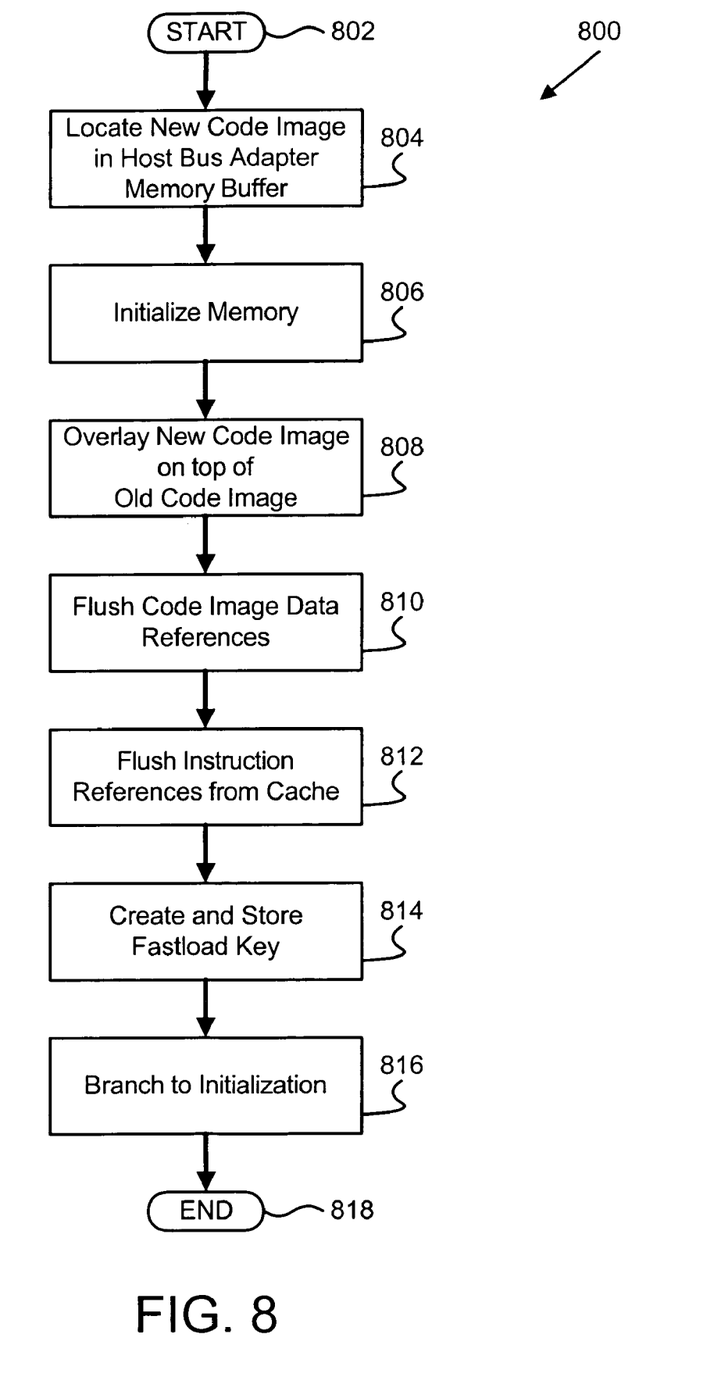
FIG. 8 is a schematic flow chart diagram illustrating one embodiment of a code image copy method in accordance with the present invention.

FIG. 8 depicts one embodiment of a code image copy method 800 that may be employed on the host bus adapter 300. In one embodiment, the code image copy method 800 occurs at some time after the code image preparation method 600 is complete and the host bus adapter 300 is taken 618 off-line. The illustrated code image copy method 800 begins 802 by locating 804 the new code image 316, for instance, in the local memory device 310 of the host bus adapter 300. The memory initialization module 324 then initializes 806 the local memory device 310 as necessary.

The image overlay module 326 then overlays 808 the old code image 314 with the new code image 316, as discussed above with reference to FIG. 3. The image overlay module 326, in one embodiment, also may flush 810 any code image data references and flush 812 instruction references from the cache since these references correspond to the old code image 314 that was overlaid 808. However, in certain embodiments, the image overlay module 326 need not remove any portion of or reference to the new code image 316 or old code image 314. The fastload key module 328 then may create and store 814 a fastload key, for example, in the metadata segment 502 of the new code image 316 to indicate that the fastload code update is performed. The bootstrap module 510 subsequently branches 816 to initialization and the depicted code image copy method 800 then ends 818.

Figure 9:
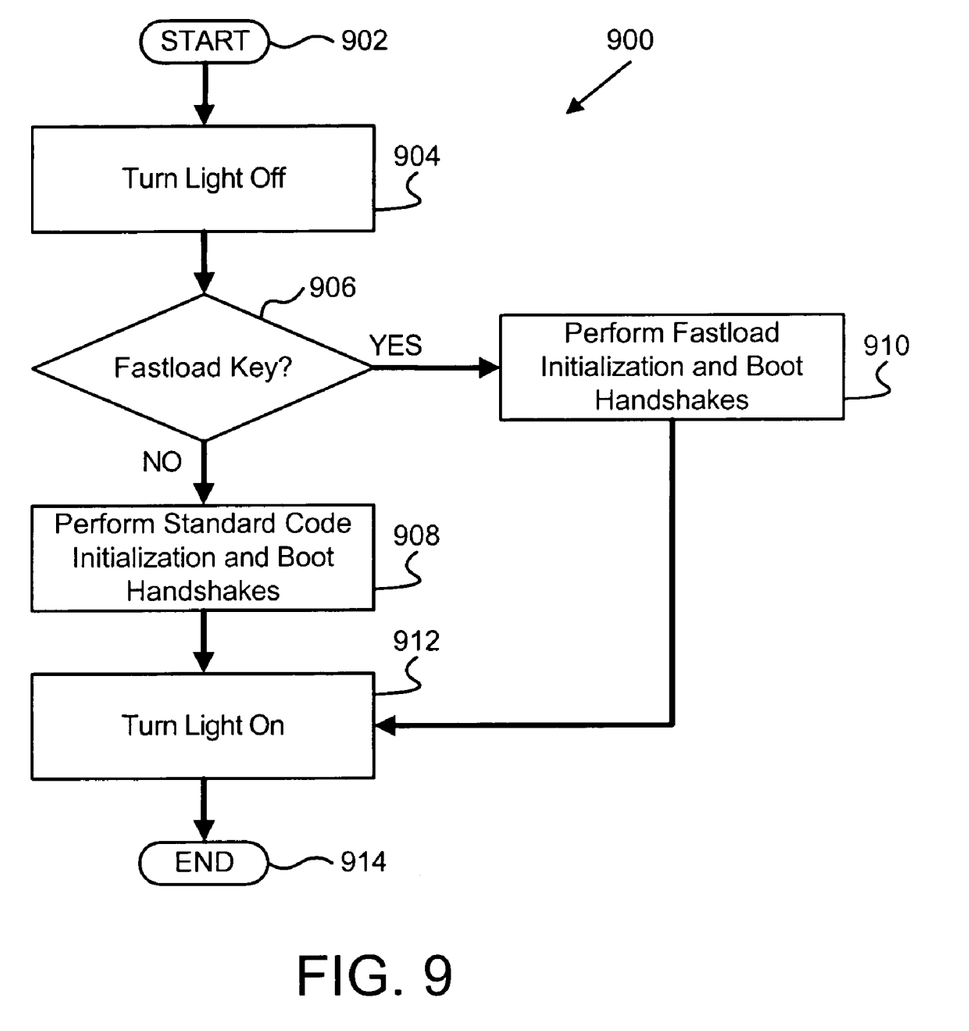
FIG. 9 is a schematic flow chart diagram illustrating one embodiment of a code image initialization method in accordance with the present invention.

FIG. 9 depicts one embodiment of a code image initialization method 900 that may be employed on the host bus adapter 300. In one embodiment, the code image initialization method is invoked by the code image copy method 700 of FIG. 7. The illustrated code image initialization method 900 begins 902 by "turning off the light" 904 of the host adapter 300. Up until this point, the host adapter 300 had briefly discontinued processing I/O, but did not shut down any hardware, including any fiber optic transmission hardware. At this point, the host bus adapter 904 shuts down at least some of the communication devices to "turn off the light" 904. In an alternate embodiment, it may be unnecessary to "turn off" 904 the light. In fact, in a certain embodiment, it is immaterial whether the light is "on" or "off."

The code image initialization method 900 then determines 906 if a fastload key exists to signify that a fastload code update was performed. In one embodiment, if the fastload key module 328 finds a proper fastload key 508 in the new code image 316, the fastload adapter initialization module 332 executes 910 a fastload initialization sequence. Otherwise, the standard initialization module 330 may implement 908 a conventional initialization sequence that may require more time than the fastload initialization sequence. After either the fastload or the standard initialization sequence is completed, the host bus adapter 300 "turns on the light" 912 and resumes processing I/O requests once again.

In a further embodiment, the fastload initialization module 332 may executer certain fastload initialization steps that are supplementary to the standard initialization sequence. In this manner, the standard initialization module 330 may implement a conventional initialization sequence with certain conventional steps replaced with steps from the fastload initialization sequence. In an alternate embodiment, the fastload initialization module 332 may execute one or more fastload initialization steps in a manner that is supplemental to a conventional initialization sequence.

Using a fastload code update and initialization sequence, the host adapter 300 may continue processing I/O throughout most of the foregoing process. In one embodiment, for example, the total time that the host adapter 300 is off-line may be approximately 2-3 seconds, including approximately 1 second during which the light is "off." When the light "turns off" 904, the host 212 will see a state change and will log back in. The host 212 will be able to log back in prior to exhausting any timeout period because the host adapter 300 is only off-line for what may appear to be a "tolerable glitch," rather than for over two minutes using conventional techniques. In a further embodiment, it may be unnecessary to "turn off" 904 the light during the code image initialization method 900, depending on the specific topology of the communication system 200 and the protocol employed by the host adapter 300. Subsequently, the code image initialization method 900 ends 914.

Although the foregoing description uses the term "host adapter" and "host bus adapter" within the scope of a storage system and storage area network, the scope of the present invention is understood to extend to all communications adapters on which microcode may be updated. The present invention is particularly applicable to updating code images on communications adapters that form a part of a communications system that benefits from minimal time off-line or maximum I/O processing time during code image updates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A concurrent code load apparatus for fastload code image update on a communications adapter, the apparatus comprising:

a fastload key module configured to create and store a fastload key in a new code image to indicate a fastload code image update on a communications adapter;

a fastload adapter initialization module configured to attempt access to the fastload key and initialize the communications adapter using a fastload initialization sequence in response to successful access to the fastload key;

a branch module configured to branch from the old code image to the new code image before the new code image has been completely written;

an image load module configured to load a copy of a new code image in a memory on the communications adapter, the memory concurrently storing a copy of an old code image used by the communications adapter;

a memory initialization module configured to invoke the new code image to perform a memory initialization operation while the old code image is still executing; and an image overlay module configured to overlay the old code image with the new code image while the old code image is still executing.

2. The apparatus of claim 1, further comprising a standard adapter initialization module configured to initialize the communications adapter using a standard initialization sequence in response to a failure to access the fastload key.

3. The apparatus of claim 2, further comprising a fastload adapter initialization module configured to execute a fastload initialization operation during the standard initialization sequence.

4. The apparatus of claim 1, wherein the old code image comprises a code image update module configured to control a code image update.

5. The apparatus of claim 4, wherein the code image update module comprises a load module configured to load the new code image in the memory.

6. The apparatus of claim 1, wherein the new code image comprises a bootstrap module configured to define a bootstrap operation, the bootstrap operation configured to facilitate a code image update.

7. The apparatus of claim 6, wherein the bootstrap module comprises the image bridge module.

8. The apparatus of claim 6, wherein the bootstrap module comprises the image overlay module.

9. The apparatus of claim 1, further comprising a query module configured to determine an incompatibility between the old code image and the new code image.

10. The apparatus of claim 1, further comprising an image bridge module configured to reconcile the incompatibility between the old code image and the new code image while the old code image is still executing.

11. A storage system for facilitating fastload code image update on a source communications adapter, the storage system comprising:

a source input device configured to receive a source electronic storage media device, the source electronic storage media device configured to store a new code image;

a storage system processor configured to generate a fastload key and to initiate a fastload code image update and notify a source communications adapter of the fastload code image update in response to successful access to the fastload key;

a source communications adapter configured to copy the new code image to a local memory device and to implement a fastload code image update;

the storage system processor further configured to determine and reconcile an incompatibility between the old code image and the new code image while the old code image is still executing.

12. A method for fastload code image update on a communications adapter, the method comprising:

creating and storing a fastload key to indicate a fastload code image update on the communications adapter;

attempting to access the fastload key and initializing the communications adapter using a fastload initialization sequence in response to successful access to the fastload key;

loading a copy of a new code image in a memory on the communications adapter, the memory concurrently storing a copy of an old code image used by the communications adapter;

invoking the new code image to perform a memory initialization operation while the old code image is still executing; and overlaying the old code image with the new code image.

13. The method of claim 12, further comprising initializing the communications adapter using a standard initialization sequence in response to a failure to access the fastload key.

14. The method of claim 12, further comprising determining an incompatibility between the old code image and the new code image.

15. The method of claim 12, further comprising reconciling the incompatibility between the old code image and the new code image while the old code image is still executing.

16. A method for fastload code image update on a communications adapter, the method comprising:

creating and storing a fastload key to indicate a fastload code image update on the communications adapter; and initializing the communications adapter using a fastload initialization sequence in response to successful access to the fastload key;

loading a copy of a new code image in a memory on the communications adapter, the memory concurrently storing a copy of an old code image used by the communications adapter;

invoking the new code image to perform a memory initialization operation while the old code image is still executing.

17. A computer readable storage medium comprising computer readable code configured to carry out a method for fastload code image update on a communications adapter, the method comprising:

creating and storing a fastload key to indicate a fastload code image update on the communications adapter;

initializing the communications adapter using a fastload initialization sequence in response to successful access to the fastload key;

loading a copy of a new code image in a memory on the communications adapter, the memory concurrently storing a copy of an old code image used by the communications adapter;

invoking the new code image to perform a memory initialization operation while the old code image is still executing; and overlaying the old code image with the new code image.

18. The computer readable storage medium of claim 17, wherein the method further comprises initializing the communications adapter using a standard initialization sequence in response to a failure to access the fastload key.

19. The computer readable storage medium of claim 17, wherein the old code image comprises a code image update module configured to control a code image update.

20. The computer readable storage medium of claim 19, wherein the code image update module comprises a load module configured to load the new code image in the memory.

21. The computer readable storage medium of claim 19, wherein the code image update module comprises a branch module configured to branch from the old code image to the new code image.

22. The computer readable storage medium of claim 17, wherein the new code image comprises a bootstrap module configured to define a bootstrap operation, the bootstrap operation configured to facilitate a code image update.

23. The computer readable storage medium of claim 22, wherein the bootstrap module comprises a conversion module, the image bridge module configured to reconcile an incompatibility between the old code image and the new code image using the conversion module.

24. The computer readable storage medium of claim 22, wherein the bootstrap module comprises a copy module, the image overlay module configured to overlay the old code image with the new code image using the copy module.

25. The computer readable storage medium of claim 17, wherein the method further comprises determining an incompatibility between the old code image and the new code image.

26. The computer readable storage medium of claim 17, wherein the method further comprises reconciling the incompatibility between the old code image and the new code image while the old code image is still executing.

27. An apparatus for fastload code image update on a communications adapter, the apparatus comprising:

means for creating and storing a fastload key to indicate a fastload code image update on the communications adapter;

means for initializing the communications adapter using a fastload initialization sequence in response to successful access to a fastload key;

means for initializing the communications adapter using a standard initialization sequence in response to a failure to access a fastload;

means for loading a copy of a new code image in a memory on the communications adapter, the memory concurrently storing a copy of an old code image used by the communications adapter;

means for invoking the new code image to perform a memory initialization operation while the old code image is still executing; and means for overlaying the old code image with the new code image.

* * * * *